(12) United States Patent
Ding (10) Patent No.: US 9,462,468 B2
(45) Date of Patent: Oct. 4, 2016

(54) WIRELESS LOCAL AREA NETWORK AUTHENTICATION METHOD AND MOBILE TERMINAL

(71) Applicant: Huawei Device Co., Ltd., Shenzhen (CN)

(72) Inventor: Ji Ding, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 39 days.

(21) Appl. No.: 14/231,902

(22) Filed: Apr. 1, 2014

(65) Prior Publication Data

US 2014/0215583 A1    Jul. 31, 2014

Related U.S. Application Data

(63) Continuation of application No. PCT/CN2012/076775, filed on Jun. 12, 2012.

(30) Foreign Application Priority Data

Oct. 8, 2011  (CN) .......................... 2011 1 0299845

(51) Int. Cl.
*G06F 7/04* (2006.01)
*H04W 12/06* (2009.01)
(Continued)

(52) U.S. Cl.
CPC ............ *H04W 12/06* (2013.01); *H04L 63/083* (2013.01); *H04L 63/18* (2013.01); *H04W 4/12* (2013.01); *H04W 12/04* (2013.01); *H04W 74/00* (2013.01); *H04W 84/12* (2013.01)

(58) Field of Classification Search
CPC .... H04L 63/083; H04W 12/06; H04W 84/12
USPC .......................................................... 726/5
See application file for complete search history.

(56) References Cited

U.S. PATENT DOCUMENTS 7,042,988 B2 * 5/2006 Juitt ........................ H04L 1/22
370/329
8,086,855 B2 * 12/2011 Katz ....................... H04L 29/06
713/170
(Continued)

FOREIGN PATENT DOCUMENTS

CN          1960280 A      5/2007
CN        101043325 A      9/2007
(Continued)

OTHER PUBLICATIONS

Foreign Communication From a Counterpart Application, European Application No. 12768575.8, Extended European Search Report dated Dec. 22, 2014, 6 pages.
(Continued)

*Primary Examiner* — Teshome Hailu
(74) *Attorney, Agent, or Firm* — Conley Rose, P.C.; Grant Rodolph; Nicholas K. Beaulieu (57) ABSTRACT

A wireless local area network authentication method is provided that includes: automatically obtaining, by a mobile terminal, an access account and an access password; and automatically sending, by the mobile terminal, a web authentication request to a network server, where the web authentication request carries the access account and the access password. A corresponding mobile terminal is also provided. By applying the wireless local area network authentication method and the mobile terminal disclosed in the present invention, a mobile terminal can automatically complete web authentication of a wireless local area network, a user does not need to enter an account and a password, and a web authentication interface does not need to be displayed to the user either, thereby avoiding a complex and repetitive authentication operation and improving user experience.

16 Claims, 8 Drawing Sheets

(51) Int. Cl.
*H04L 29/06* (2006.01)
*H04W 84/12* (2009.01)
*H04W 74/00* (2009.01)
*H04W 4/12* (2009.01)
*H04W 12/04* (2009.01)

(56) References Cited

U.S. PATENT DOCUMENTS

| | | | | |
|---|---|---|---|---|
| 2006/0236105 | A1* | 10/2006 | Brok | H04W 12/06 |
| | | | | 713/169 |
| 2008/0141352 | A1* | 6/2008 | Lindsley | H04L 63/083 |
| | | | | 726/6 |
| 2009/0168699 | A1* | 7/2009 | Lo | H04W 76/021 |
| | | | | 370/328 |
| 2009/0300722 | A1 | 12/2009 | Haverinen et al. | |
| 2010/0263022 | A1* | 10/2010 | Wynn | H04W 12/06 |
| | | | | 726/3 |
| 2011/0022841 | A1 | 1/2011 | Petillo | |

FOREIGN PATENT DOCUMENTS

| | | | |
|---|---|---|---|
| CN | 101212297 | A | 7/2008 |
| CN | 101662771 | A | 3/2010 |
| CN | 101895831 | A | 11/2010 |
| CN | 102378175 | A | 3/2012 |
| JP | 20050341404 | A | 12/2005 |
| JP | 2010074481 | A | 4/2010 |
| JP | 2012515956 | A | 7/2012 |
| KR | 20090089394 | A | 8/2009 |
| WO | 2010083522 | A1 | 7/2010 |

OTHER PUBLICATIONS

Partial English Translation and Abstract of Chinese Patent Application No. CN101212297A, Aug. 13, 2014, 4 pages.
Partial English Translation and Abstract of Chinese Patent Application No. CN101895831A, Jun. 20, 2014, 4 pages.
Foreign Communication From a Counterpart Application, Chinese Application No. 201110299845.1, Chinese Office Action dated Jul. 3, 2013, 5 pages.
Foreign Communication From a Counterpart Application, Chinese Application No. 201110299845.1, Chinese Search Report dated Jun. 25, 2013, 2 pages.
Foreign Communication From a Counterpart Application, PCT Application No. PCT/CN2012/076775, English Translation of International Search Report dated Sep. 6, 2012, 3 pages.
Foreign Communication From a Counterpart Application, PCT Application No. PCT/CN2012/076775, English Translation of Written Opinion dated Sep. 6, 2012, 15 pages.
Partial English Translation and Abstract of Japanese Patent Application No. JP2005341404A, Part 1, Jul. 9, 2015, 4 pages.
Partial English Translation and Abstract of Japanese Patent Application No. JP2005341404A, Part 2, Jul. 9, 2015, 11 pages.
Partial English Translation and Abstract of Japanese Patent Application No. JP2010074481A, Part 1, Jul. 9, 2015, 4 pages.
Partial English Translation and Abstract of Japanese Patent Application No. JP2010074481A, Part 2, Jul. 9, 2015, 11 pages.
Partial English Translation and Abstract of Japanese Patent Application No. JP2012515956A, Part 1, Jul. 9, 2015, 4 pages.
Partial English Translation and Abstract of Japanese Patent Application No. JP2012515956A, Part 2, Jul. 9, 2015, 14 pages.
Partial English Translation and Abstract of Japanese Patent Application No. JP2012515956A, Part 3, Jul. 9, 2015, 5 pages.
Foreign Communication From a Counterpart Application, Chinese Application No. 2014-533757, Chinese Office Action dated Jun. 16, 2015, 4 pages.
Foreign Communication From a Counterpart Application, Chinese Application No. 2014-533757, English Translation of Chinese Office Action dated Jun. 16, 2015, 5 pages.
Foreign Communication From a Counterpart Application, Korean Application No. 2015-073013309, Korean Office Action dated Oct. 22, 2015, 5 pages.
Foreign Communication From a Counterpart Application, Korean Application No. 2015-073013309, English Translation of Korean Office Action dated Nov. 5, 2015, 7 pages.

* cited by examiner

WIRELESS LOCAL AREA NETWORK AUTHENTICATION METHOD AND MOBILE TERMINAL

CROSS-REFERENCE TO RELATED APPLICATIONS

This application is a continuation of International Application No. PCT/CN2012/076775, filed on Jun. 12, 2012, which claims priority to Chinese Patent Application No. 201110299845.1, filed on Oct. 8, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a wireless local area network authentication method and a mobile terminal.

BACKGROUND

With the development of a mobile data service, a wireless local area network (WLAN) technology becomes a widely used wireless access technology, and various major telecommunications carriers list a wireless local area network as a key service to expand. To attract existing users and facilitate charging, carriers all introduce a web authentication manner. That is, after a user accesses a wireless local area network hotspot of a carrier, the user will be directed to a web authentication page; and after the user enters an account and a password on the web authentication page and authentication is performed by a network server successfully, the user can use a wireless local area network provided by the carrier.

However, although web authentication is beneficial to charging performed by a carrier for usage of a wireless local area network, a user needs to enter an account and a password on a web authentication page each time when the user accesses the wireless local area network. For the user, such a complex and repetitive operation is meaningless, and wastes a lot of time.

SUMMARY

Embodiments of the present invention disclose a wireless local area network authentication method and a mobile terminal, so as to solve a problem that a user needs to enter an account and a password on a web authentication page each time when the user accesses a wireless local area network.

An embodiment of the present invention discloses a wireless local area network authentication method, including: automatically obtaining, by a mobile terminal, an access account and an access password; and automatically sending, by the mobile terminal, a web authentication request to a network server, where the web authentication request carries the access account and the access password.

An embodiment of the present invention discloses a mobile terminal, including: an account and password obtaining apparatus, a web authentication request initiating apparatus, and an input/output apparatus, where the account and password obtaining apparatus is configured to automatically obtain an access account and an access password, and transmit the access account and the access password to the web authentication request initiating apparatus; the web authentication request initiating apparatus is configured to generate a web authentication request that carries the access account and the access password, and transmit the web authentication request to the input/output apparatus; and the input/output apparatus is configured to send the web authentication request to a network server.

By applying the wireless local area network authentication method and the mobile terminal disclosed in the embodiments of the present invention, a mobile terminal can automatically complete web authentication of a wireless local area network, a user does not need to enter an account and a password, and a web authentication interface does not need to be displayed to the user either, thereby avoiding a complex and repetitive authentication operation and improving user experience.

DETAILED DESCRIPTION

In order to make the objectives, technical solutions and advantages of the present invention clearer, specific embodiments of the present invention are described in detail in the following with reference to the accompanying drawings. The described embodiments are a part rather than all of the embodiments of the present invention. All other embodiments obtained by persons of ordinary skill in the art based on the embodiments of the present invention without creative efforts shall fall within the protection scope of the present invention.

First, it should be noted that, a mobile terminal described in the embodiments of the present invention includes, but is not limited to, a terminal device that can access a wireless local area network, such as a mobile phone or a tablet computer.

Method Embodiments

Embodiment 1

Figure 1:
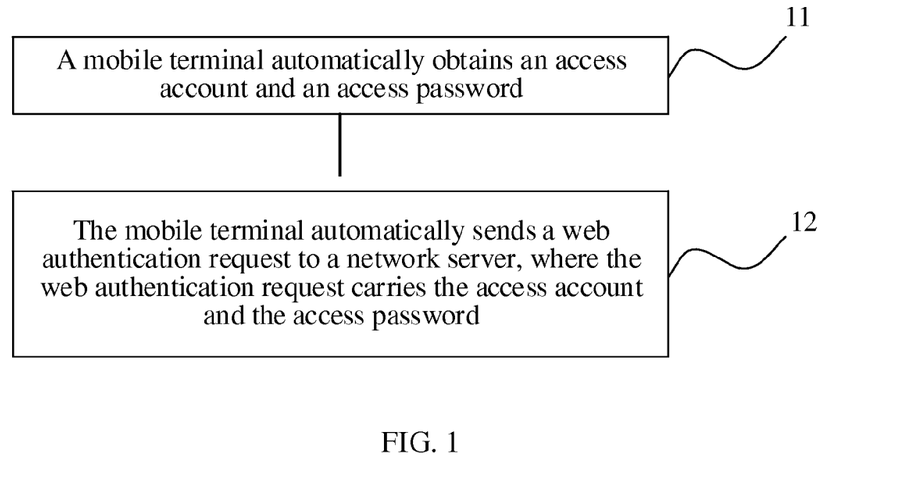
FIG. 1 is a schematic flowchart of a wireless local area network authentication method according to Embodiment 1 of the present invention.

Referring to FIG. 1, Embodiment 1 of the present invention provides a wireless local area network authentication method, which includes the following steps:

Step 11: A mobile terminal automatically obtains an access account and an access password.

The access account and the access password are an account and a password used by the mobile terminal to complete authentication performed by a network server to access a wireless local area network. Specifically, the mobile terminal may store a wireless local area network hotspot of a carrier in advance according to setting of a user, for example, store a service set identifier (SSID) of the wireless local area network hotspot as "ChinaNet". The mobile terminal needs no account and password to establish a connection to a wireless local area network hotspot; therefore, when the mobile terminal needs to access a wireless local area network, the mobile terminal first automatically establishes a connection to a preset wireless local area network hotspot "ChinaNet", then sends a wireless local area network access request to the network server, and receives web authentication page data returned by the network server, but does not display a web authentication page to the user. Then, the mobile terminal automatically obtains an access account and an access password of the wireless local area network; and when the mobile terminal automatically obtains the access account and the access password of the wireless local area network, the user does not need to perform any operation.

Step 12: The mobile terminal automatically sends a web authentication request to the network server, where the web authentication request carries the access account and the access password.

The mobile terminal automatically sends a web authentication request to the network server, where the web authentication request carries the access account and the access password that are automatically obtained in step 11, and the web authentication request may be data that is based on a data protocol such as the Hypertext Transfer Protocol (HTTP). The network server authenticates the access account and the access password. If the access account and the access password are correct, the network server returns an authentication result that a network connection succeeds to the mobile terminal; and if the access account and the access password are incorrect, the network server returns an authentication result that a network connection fails to the mobile terminal. In this step, the user does not need to enter the account and the password, and the mobile terminal does not need to display a web authentication interface to the user either, where the web authentication interface is sent by the network server.

In this embodiment, a mobile terminal automatically obtains an access account and an access password, and automatically sends, to a network server, a web authentication request that carries the access account and the access password. By applying this embodiment, a mobile terminal can automatically complete web authentication of a wireless local area network, a user does not need to enter an account and a password, and a web authentication interface does not need to be displayed to the user either, thereby avoiding a complex and repetitive authentication operation and improving user experience.

Embodiment 2

Figure 2:
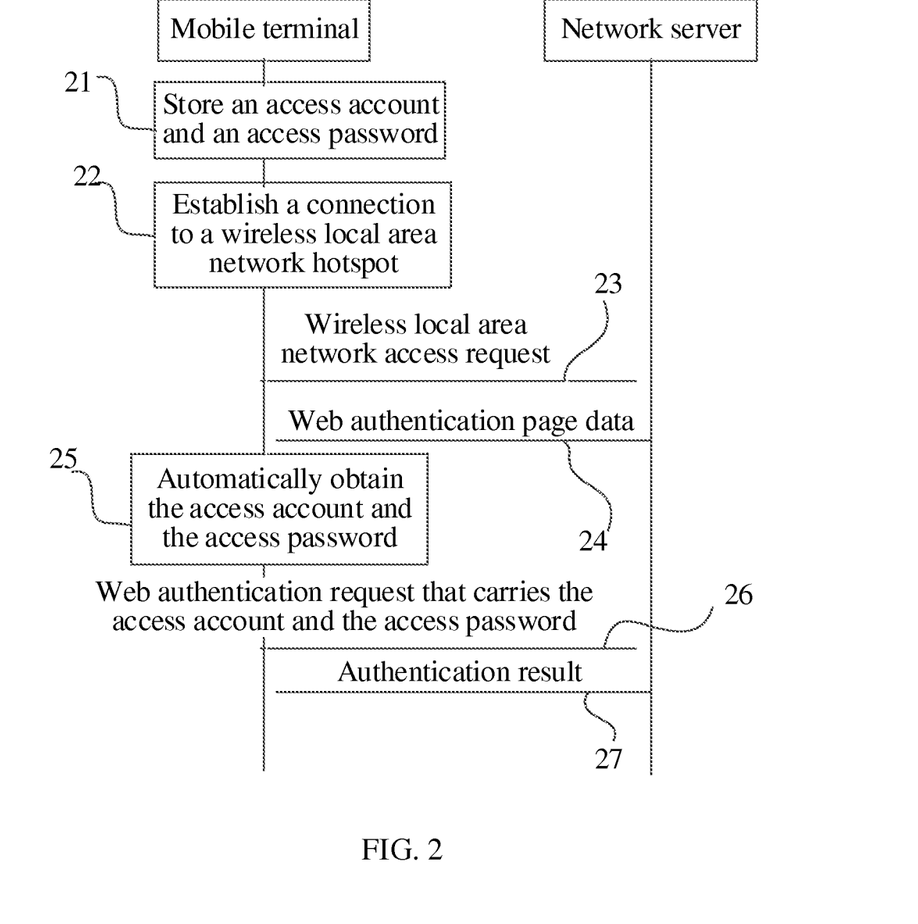
FIG. 2 is a schematic flowchart of another wireless local area network authentication method according to Embodiment 2 of the present invention.

Referring to FIG. 2, Embodiment 2 of the present invention provides another wireless local area network authentication method, which adopts a static authentication manner, and includes the following steps:

Step 21: A mobile terminal stores an access account and an access password.

Optionally, the mobile terminal may select a static authentication manner or a dynamic authentication manner to perform wireless local area network access authentication. In Embodiment 2, the static authentication manner is selected.

The mobile terminal first stores the access account and the access password according to an input of a user, and may also store an SSID of a wireless local area network hotspot, for example, according to the input of the user, store the SSID of the wireless local area network hotspot as "ChinaNet", store the access account as "user", and store the access password as "1234". Herein, the access account and the access password are determined through negotiation between a user and a carrier. The mobile terminal may store multiple SSIDs and access accounts and access passwords corresponding to the multiple SSIDs. For example, the mobile terminal may store SSIDs of both China Telecom and China Mobile. The SSIDs of both China Telecom and China Mobile correspond to different access accounts and access passwords, so that when being connected to a different wireless local area network hotspot, the mobile terminal may perform authentication by using an access account and an access password corresponding to an SSID of the wireless local area network hotspot.

Step 22: The mobile terminal establishes a connection to a wireless local area network hotspot.

Currently, a mobile terminal and a wireless local area network hotspot are connected in an open manner, and therefore the mobile terminal may establish a connection to the wireless local area network hotspot according to the SSID that is stored in advance in step 21.

Step 23: The mobile terminal sends a wireless local area network access request to a network server.

The network server is a network server that provides a service for the wireless local area network hotspot to which the mobile terminal establishes the connection.

Step 24: The network server returns web authentication page data to the mobile terminal.

It should be noted that, after receiving the web authentication page data from the network server, the mobile terminal does not need to display a web authentication page to the user.

Step 25: The mobile terminal automatically obtains the access account and the access password.

The mobile terminal automatically obtains the access account and the access password that are stored in step 21, where the access account and the access password correspond to the SSID of the wireless local area network hotspot that is currently connected to the mobile terminal.

Step 26: The mobile terminal automatically sends a web authentication request to the network server, where the web authentication request carries the access account and the access password.

The mobile terminal encapsulates the access account and the access password that are automatically obtained by the mobile terminal into a web authentication request in a format of an HTTP data packet, and sends the web authentication request to the network server. Therefore, in an authentication process for the mobile terminal to access a wireless local area network, the user does not need to perform an operation such as entering an account and a password, and the mobile terminal does not need to display a web authentication interface to the user either, where the web authentication interface is sent by the network server.

Step 27: The network server authenticates the web authentication request, and returns an authentication result to the mobile terminal.

The network server authenticates the access account and the access password. If the access account and the access password are correct, the network server returns an authentication result that a network connection succeeds to the mobile terminal; and if the access account and the access password are incorrect, the network server returns an authentication result that a network connection fails to the mobile terminal.

In this embodiment, a mobile terminal adopts a static authentication manner to perform wireless local area network authentication. The mobile terminal stores an access account and an access password, establishes a connection to a wireless local area network hotspot, and receives web authentication page data returned by a network server, but does not display the web authentication page data to a user; and then the mobile terminal automatically obtains the access account and the access password, and automatically sends, to the network server, a web authentication request that carries the access account and the access password. The network server authenticates the web authentication request, and returns an authentication result to the mobile terminal. By applying this embodiment, a mobile terminal can automatically complete static web authentication of a wireless local area network, a user does not need to enter an account and a password, and a web authentication interface does not need to be displayed to the user either, thereby avoiding a complex and repetitive authentication operation and improving user experience.

Embodiment 3

Figure 3:
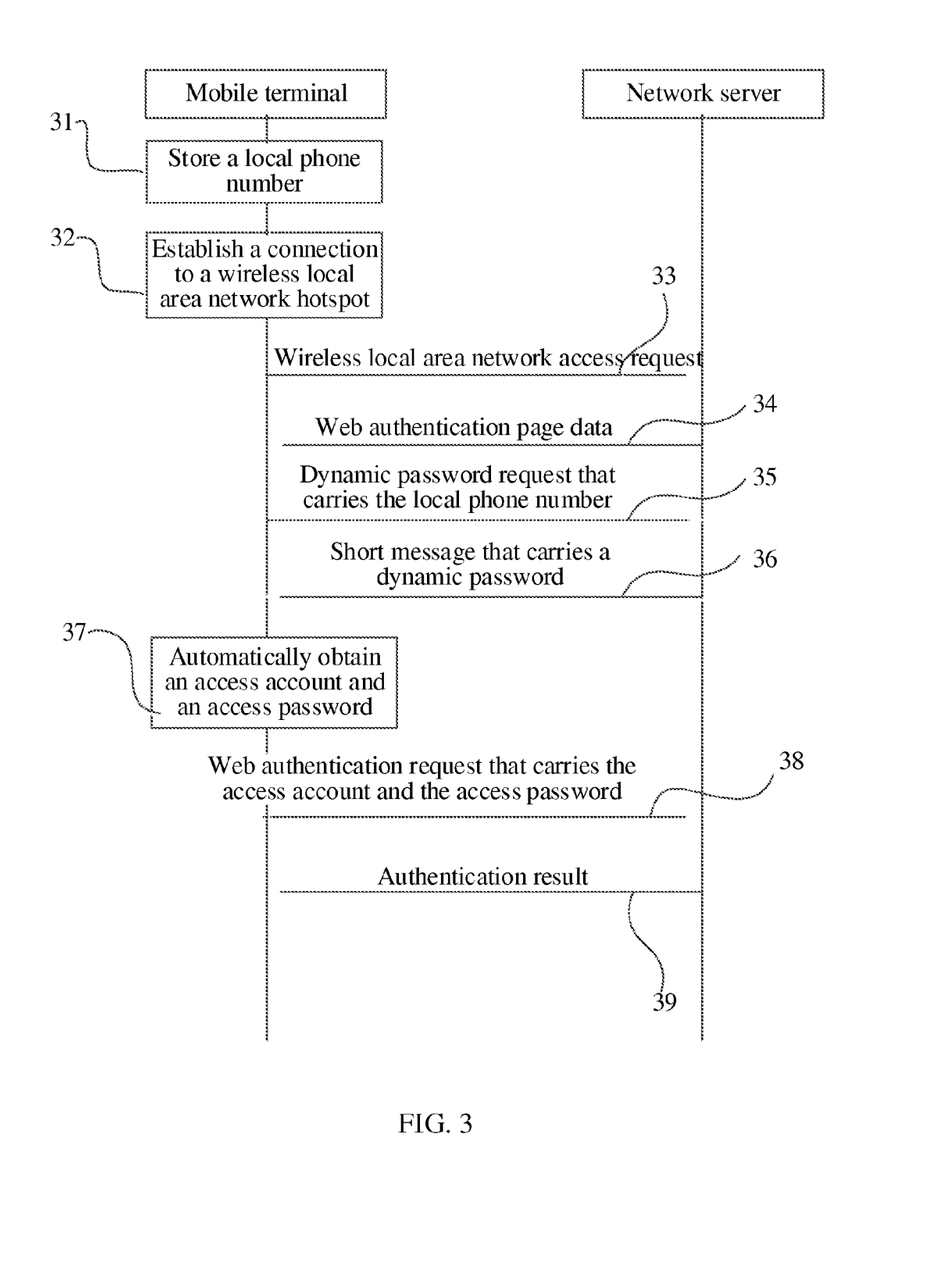
FIG. 3 is a schematic flowchart of another wireless local area network authentication method according to Embodiment 3 of the present invention.

Referring to FIG. 3, Embodiment 3 of the present invention provides another wireless local area network authentication method, which adopts a dynamic authentication manner, and includes the following steps:

Step 31: A mobile terminal stores a local phone number.

Optionally, the mobile terminal may select a static authentication manner or a dynamic authentication manner to perform wireless local area network access authentication. In embodiment 3, the dynamic authentication manner is selected.

Optionally, the mobile terminal may store a local phone number and an SSID according to an input of a user, for example, store the SSID as "ChinaNet" and the local phone number as "18912345678" according to the input of the user; and the mobile terminal may also read and store the local phone number by itself. If the mobile terminal is a terminal into which two subscriber identity module cards can be inserted and which can read two local phone numbers, the user selects a local phone number for storing.

Step 32: The mobile terminal establishes a connection to a wireless local area network hotspot.

Step 33: The mobile terminal sends a wireless local area network access request to a network server.

Step 34: The network server returns web authentication page data to the mobile terminal.

Step 32 to step 34 are similar to step 22 to step 24 in Embodiment 2. Refer to Embodiment 2 for specific description, which is not repeated herein.

Step 35: The mobile terminal automatically obtains the local phone number "18912345678" stored in the mobile terminal, and sends, to the network server, a dynamic password request that carries the local phone number "18912345678".

The dynamic password request carries the local phone number "18912345678", so that the network server sends, according to the local phone number "18912345678", a short message that carries a dynamic password, to the mobile terminal whose number is "18912345678".

Step 36: The network server returns, to the mobile terminal, a short message that carries a dynamic password.

Optionally, the short message that carries the dynamic password may carry a dynamic password and a dynamic account; or may carry only a dynamic password but does not carry a dynamic account.

Step 37: The mobile terminal automatically obtains an access account and an access password.

Optionally, if the short message received in step 36 also carries a dynamic account, the mobile terminal may obtain the dynamic account carried in the short message, to use the dynamic account as the access account, and obtain the dynamic password carried in the short message, to use the dynamic password as the access password; and if the short message received in step 36 does not carry a dynamic account, the mobile terminal may obtain the local phone number stored in the mobile terminal, to use the local phone number as the access account, and obtain the dynamic password carried in the short message, to use the dynamic password as the access password.

Specifically, the mobile terminal may screen, in a manner of matching a sending number or textual content, the short message that carries the dynamic password; and may obtain the dynamic account or the dynamic password from the short message in a manner of matching a keyword. For example, the mobile terminal screens, in a manner of matching a sending number "10001", the short message that carries the dynamic password; and if a calling number of a certain received short message is "10001", the mobile terminal considers that the short message is the short message that carries the dynamic password. Alternatively, the mobile terminal screens, in a manner of matching content that includes a text similar to "WLAN", "WiFi", "password", and the like, the short message that carries the dynamic password, and the mobile terminal scans a received short message; and if a certain short message carries textual content such as "WLAN" or "password", the mobile terminal considers that the short message is the short message that carries the dynamic password. Then, the mobile terminal obtains the dynamic account and the dynamic password by matching a keyword, such as "account", "user name", or "password". The following short message is used as an example: "Dear user, your temporary WLAN access account is 31919236104, and the password is 807602, valid within 6 hours." In this case, the mobile terminal scans the short message, matches keywords "account" and "password", and reads a dynamic account as "31919236104" and a dynamic password as "807602". If the short message is "Dear user, your temporary WLAN access password is 807602, valid within 6 hours", and the mobile terminal, through scanning and matching, reads the dynamic password as "807602" but fails to read the dynamic account, the mobile terminal obtains the local phone number "18912345678" that is stored in step 31, to use the local phone number "18912345678" as the access account. In this way, the mobile terminal can automatically obtain an access account and an access password, so that the user neither needs to read a short message from the network server, nor needs to perform an operation of entering a dynamic password or a dynamic account included in the short message.

Step 38: The mobile terminal automatically sends a web authentication request to the network server, where the web authentication request carries the access account and the access password.

Step 39: The network server authenticates the web authentication request, and returns an authentication result to the mobile terminal.

Step 38 and step 39 are similar to step 26 to step 27 in Embodiment 2. Refer to Embodiment 2 for specific description, which is not repeated herein.

In this embodiment, a mobile terminal adopts a dynamic authentication manner to perform wireless local area network authentication. The mobile terminal stores a local phone number, and establishes a connection to a wireless local area network hotspot; the network server returns web authentication page data to the mobile terminal; the mobile terminal sends, to the network server, a dynamic password request that carries the local phone number; the network server returns, to the mobile terminal, a short message that carries a dynamic password; and then the mobile terminal automatically obtains an access account and an access password, and automatically sends, to the network server, a web authentication request that carries the access account and the access password; and the network server authenticates the web authentication request, and returns an authentication result to the mobile terminal. By applying this embodiment, a mobile terminal can automatically complete dynamic web authentication of a wireless local area network, a user does not need to enter a local phone number, an access password, or an access account when the user accesses the wireless local area network, and a web authentication interface does not need to be displayed to the user either, and the user does not need to read a short message that carries a dynamic password, thereby avoiding a complex and repetitive authentication operation and improving user experience.

Apparatus Embodiments

Embodiment 4

Figure 4:
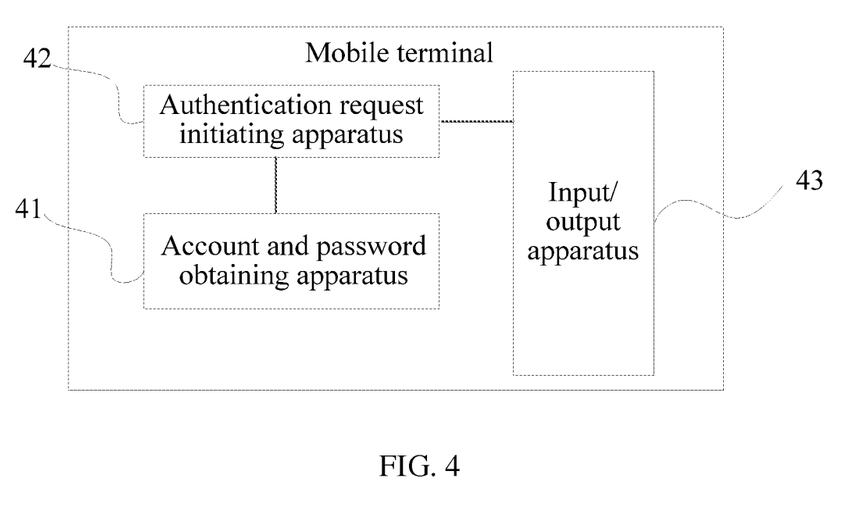
FIG. 4 is a schematic structural diagram of a mobile terminal according to Embodiment 4 of the present invention.

Referring to FIG. 4, an embodiment of the present invention provides a mobile terminal, which may include the following structure: an account and password obtaining apparatus 41, a web authentication request initiating apparatus 42, and an input/output apparatus 43, where the account and password obtaining apparatus 41 is configured to automatically obtain an access account and an access password, and transmit the access account and the access password to the web authentication request initiating apparatus 42; the web authentication request initiating apparatus 42 is configured to generate a web authentication request that carries the access account and the access password, and transmit the web authentication request to the input/output apparatus 43; and the input/output apparatus 43 is configured to send the web authentication request to a network server.

The input/output apparatus 43 may specifically be a radio frequency chip, a signal transmit/receive antenna, or the like.

The access account and the access password are an account and a password used by the mobile terminal to complete web authentication performed by a network server to access a wireless local area network. Specifically, when the mobile terminal needs to access a wireless local area network, the mobile terminal automatically establishes a connection to a wireless local area network hotspot, then sends a wireless local area network access request to the network server, and receives web authentication page data returned by the network server, but does not display a web authentication page to a user. Then, the account and password obtaining apparatus 41 automatically obtains an access account and an access password of the wireless local area network; and when the account and password obtaining apparatus 41 automatically obtains the access account and the access password of the wireless local area network, the user does not need to perform any operation. Then, the web authentication request initiating apparatus 42 encapsulates the access account and access password that are automatically obtained by the account and password obtaining apparatus 41 into a web authentication request in a format of an HTTP data packet, and transmits, to the input/output apparatus 43, the web authentication request that carries the access account and the access password; the input/output apparatus 43 sends the web authentication request to the network server; and the network server authenticates the access account and the access password.

In this embodiment, the mobile terminal includes the following structure: the account and password obtaining apparatus 41, the web authentication request initiating apparatus 42, and the input/output apparatus 43, where the account and password obtaining apparatus 41 automatically obtains an access account and an access password, the web authentication request initiating apparatus 42 generates, according to the access account and the access password, a web authentication request that carries the access account and the access password, and sends the web authentication request to a network server by using the input/output apparatus 43, and the network server performs authentication. By applying this embodiment of the present invention, a mobile terminal can automatically complete web authentication of a wireless local area network, a user does not need to enter an account and a password, and a web authentication interface does not need to be displayed to the user either, thereby avoiding a complex and repetitive authentication operation and improving user experience.

Embodiment 5

Figure 5:
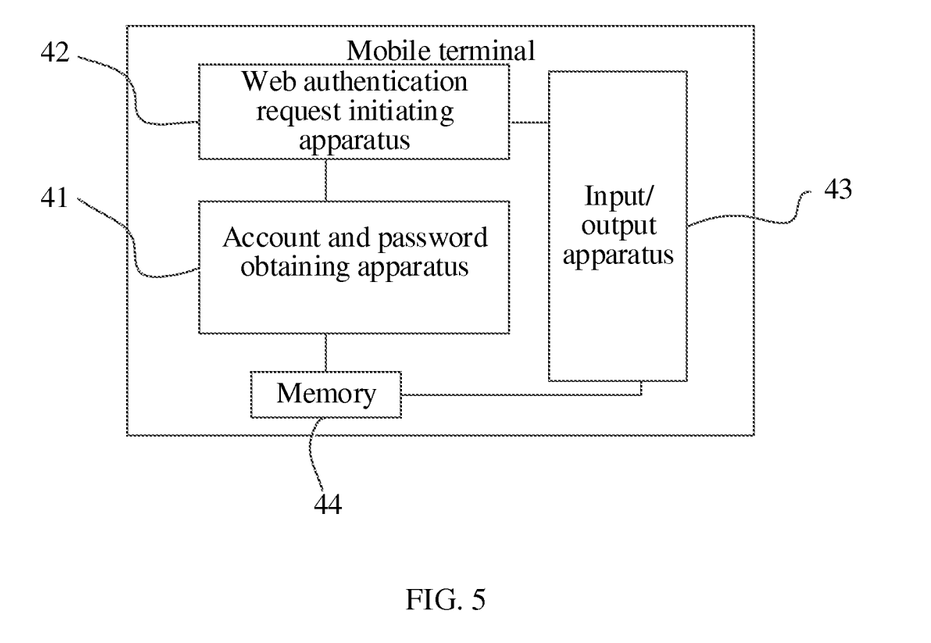
FIG. 5 is a schematic structural diagram of another mobile terminal according to Embodiment 5 of the present invention.

Referring to FIG. 5, an embodiment of the present invention provides a mobile terminal, which may include the following structure: an account and password obtaining apparatus 41, a web authentication request initiating apparatus 42, and an input/output apparatus 43, where the account and password obtaining apparatus 41 is configured to automatically obtain an access account and an access password, and transmit the access account and the access password to the web authentication request initiating apparatus 42; the web authentication request initiating apparatus 42 is configured to generate a web authentication request that carries the access account and the access password, and transmit the web authentication request to the input/output apparatus 43; and the input/output apparatus 43 is configured to send the web authentication request to a network server.

Optionally, the mobile terminal further includes: a memory 44 connected to the account and password obtaining apparatus 41 and the input/output apparatus 43, and configured to store the access account, the access password, or a local phone number, so that the account and password obtaining apparatus 41 can automatically obtain the access account and the access password.

Optionally, the memory 44 may store the access account, the access password, or the local phone number according to an input of a user by using an input/output device 43.

The memory 44 may be a dedicated memory, may be a part of a storage space in a memory with large capacity, or may be an external memory that is connected to the mobile terminal, such as a secure digital (SD) card.

In this embodiment, the mobile terminal includes the following structure: the account and password obtaining apparatus 41, the web authentication request initiating apparatus 42, the input/output apparatus 43, and the memory 44, where the memory 44 stores an access account, an access password, or a local phone number, so that the account and password obtaining apparatus 41 automatically obtains the access account and the access password, the web authentication request initiating apparatus 42 generates, according to the access account and the access password, a web authentication request that carries the access account and the access password, and sends the web authentication request to a network server by using the input/output apparatus 43, and the network server performs authentication. By applying this embodiment of the present invention, a mobile terminal can automatically complete web authentication of a wireless local area network, a user does not need to enter an account and a password, and a web authentication interface does not need to be displayed to the user either, thereby avoiding a complex and repetitive authentication operation and improving user experience.

Embodiment 6

Figure 6:
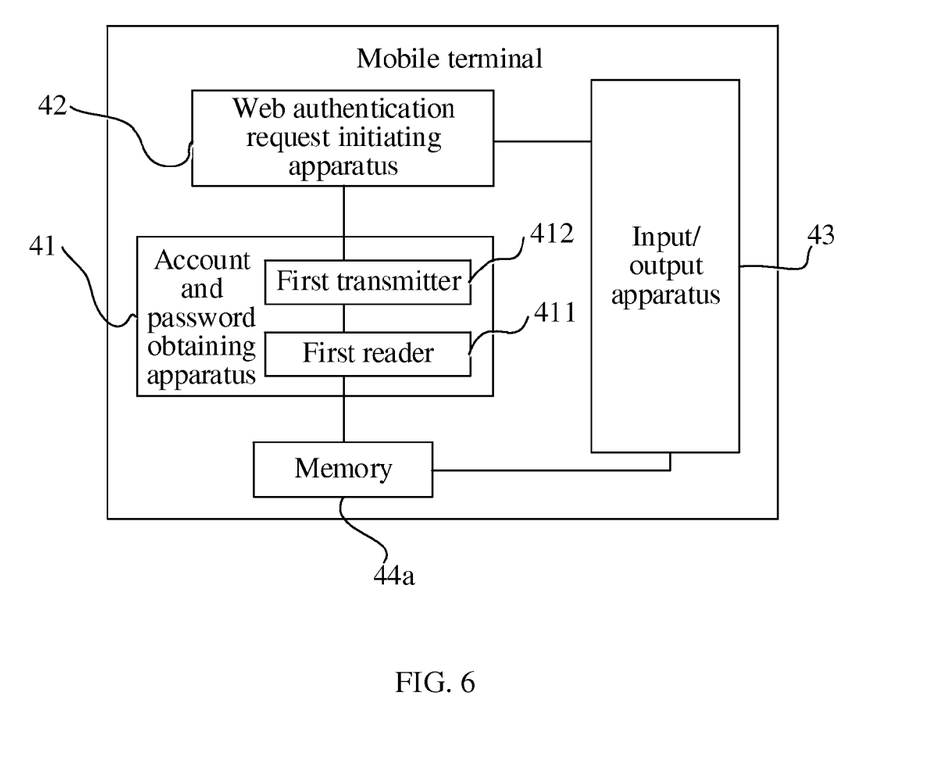
FIG. 6 is a schematic structural diagram of another mobile terminal according to Embodiment 6 of the present invention.

Referring to FIG. 6, an embodiment of the present invention provides a mobile terminal, which accesses a wireless local area network in a static authentication manner, and may include the following structure: an account and password obtaining apparatus 41, a web authentication request initiating apparatus 42, and an input/output apparatus 43, where the account and password obtaining apparatus 41 is configured to automatically obtain an access account and an access password, and transmit the access account and the access password to the web authentication request initiating apparatus 42; the web authentication request initiating apparatus 42 is configured to generate a web authentication request that carries the access account and the access password, and transmit the web authentication request to the input/output apparatus 43; and the input/output apparatus 43 is configured to send the web authentication request to a network server.

Optionally, the mobile terminal further includes: a memory 44a connected to the account and password obtaining apparatus 41 and the input/output apparatus 43, and configured to store the access account and the access password, so that the account and password obtaining apparatus 41 can automatically obtain the access account and the access password.

The memory 44a needs to store the access account and the access password according to an input of a user by using an input/output device 43.

Further, the account and password obtaining apparatus 41 may include the following structure: a first reader 411 and a first transmitter 412, where the first reader 411 is configured to obtain the access account and the access password that are stored in the memory 44a, and transmit them to the first transmitter 412; and the first transmitter 412 is configured to transmit, to the web authentication request initiating apparatus 42, the access account and the access password that are received from the first reader 411.

Specifically, the memory 44a stores the access account and the access password according to an input of a user, and may also store an SSID of a wireless local area network hotspot, for example, according to the input of the user, store the SSID of the wireless local area network hotspot as "ChinaNet", store the access account as "user", and store the access password as "1234". Herein, the access account and the access password are determined through negotiation between a user and a carrier. The memory 44a may store multiple SSIDs and access accounts and access passwords corresponding to the multiple SSIDs. For example, the memory 44a may store SSIDs of both China Telecom and China Mobile. The SSIDs of both China Telecom and China Mobile correspond to different access accounts and access passwords, so that when being connected to a different wireless local area network hotspot, the mobile terminal may perform authentication by using an access account and an access password corresponding to an SSID of the wireless local area network hotspot. When the wireless local area network needs to be accessed, the first reader 411 reads the access account and the access password that are stored in the memory 44a, and sends them to the first transmitter 412; the first transmitter 412 sends, to the web authentication request initiating apparatus 42, the access account and the access password that are received from the first reader 411; and the web authentication request initiating apparatus 42 encapsulates the access account and the access password into a web authentication request, and automatically sends, by using the input/output apparatus 43, the web authentication request to the network server for authentication.

In this embodiment, the mobile terminal accesses a wireless local area network in a static authentication manner, and includes the following structure: the account and password obtaining apparatus 41, the web authentication request initiating apparatus 42, the input/output apparatus 43, and the memory 44a, where the account and password obtaining apparatus 41 further includes: the first reader 411 and the first transmitter 412, where the memory 44a stores an access account or an access password, the first reader 411 obtains the access account and the access password that are stored in the memory 44a, and transmits them to the first transmitter 412, the first transmitter 412 transmits the access account and the access password to the web authentication request initiating apparatus 42, the web authentication request initiating apparatus 42 generates, according to the access account and the access password, a web authentication request that carries the access account and the access password, where the web authentication request may be data that is based on a data protocol such as the HTTP, and sends the web authentication request to a network server by using the input/output apparatus 43, and the network server performs authentication. By applying this embodiment of the present invention, a mobile terminal only needs to store an access account and an access password in advance to automatically complete web authentication of a wireless local area network, so that the account and the password do not need to be repeatedly entered, and a web authentication interface does not need to be displayed to a user either, thereby avoiding a complex and repetitive authentication operation and improving user experience.

Embodiment 7

Figure 7:
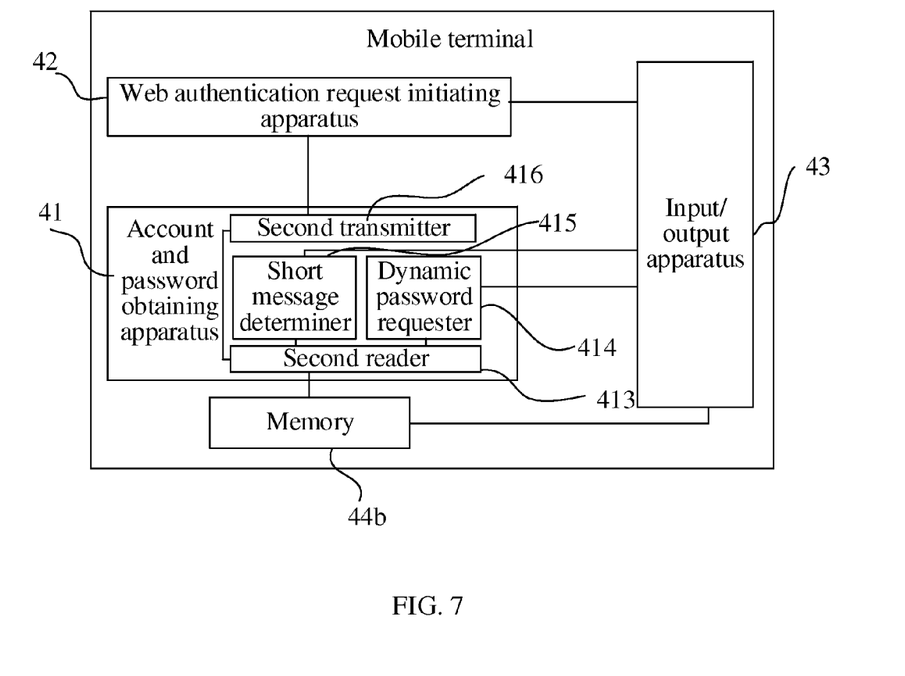
FIG. 7 is a schematic structural diagram of another mobile terminal according to Embodiment 7 of the present invention.

Referring to FIG. 7, an embodiment of the present invention provides a mobile terminal, which accesses a wireless local area network in a dynamic authentication manner, and may include the following structure: an account and password obtaining apparatus 41, a web authentication request initiating apparatus 42, and an input/output apparatus 43, where the account and password obtaining apparatus 41 is configured to automatically obtain an access account and an access password, and transmit the access account and the access password to the web authentication request initiating apparatus 42; the web authentication request initiating apparatus 42 is configured to generate a web authentication request that carries the access account and the access password, and transmit the web authentication request to the input/output apparatus 43; and the input/output apparatus 43 is configured to send the web authentication request to a network server.

Optionally, the mobile terminal further includes: a memory 44b connected to the account and password obtaining apparatus 41 and the input/output apparatus 43 and configured to store a local phone number, so that the account and password obtaining apparatus 41 can automatically obtain the access account and the access password.

Optionally, the memory 44b may store the local phone number according to an input of a user by using an input/output device 43.

Further, the account and password obtaining apparatus 41 may include the following structure: a second reader 413, a dynamic password requester 414, a short message determiner 415, and a second transmitter 416, where the second reader 413 is configured to obtain the local phone number stored in the memory 44b, obtain a dynamic password from a short message that carries the dynamic password and is determined by the short message determiner 415, to use the dynamic password as the access password and use the obtained local phone number as the access account; and if the short message further carries a dynamic account, obtain the dynamic password to use the dynamic password as the access password, and obtain the dynamic account to use the dynamic account as the access account; the dynamic password requester 414 is configured to obtain the local phone number from the second reader 413, and send, to the network server by using the input/output apparatus 43, a dynamic password request that carries the local phone number; the short message determiner 415 is configured to determine, by using the input/output apparatus 43, the short message that carries the dynamic password, and transmit the short message to the second reader 413; and the second transmitter 416 is configured to obtain the access account and the access password from the second reader 413, and send the access account and the access password to the web authentication request initiating apparatus 42.

Specifically, first the memory 44b stores a local phone number and an SSID according to an input of a user by using the input/output apparatus 43. The following is an example. The SSID is stored as "ChinaNet" and the local phone number is stored as "18912345678" according to the input of the user. When the mobile terminal needs to access a wireless local area network, the second reader 413 obtains the local phone number "18912345678" stored in the memory 44b, and then the dynamic password requester 414 obtains the local phone number "18912345678" from the second reader 413, and sends, by using the input/output apparatus 43, a dynamic password request that carries the local phone number "18912345678" to the network server; and the network server sends a short message that carries the dynamic password to the mobile terminal whose number is "18912345678", where the short message that carries the dynamic password may carry a dynamic password and a dynamic account, or may carry only a dynamic password but does not carry a dynamic account.

Specifically, the short message determiner 415 may perform screening in a manner of matching a sending number or textual content, so as to receive the short message that carries the dynamic password. For example, the short message determiner 415 screens, in a manner of matching a sending number "10001", the short message that carries the dynamic password; and if a calling number of a certain received short message is "10001", the short message determiner 415 considers that the short message is the short message that carries the dynamic password. Alternatively, the short message determiner 415 screens, in a manner of matching content that includes a text similar to "WLAN", "password", and the like, the short message that carries the dynamic password, and the short message determiner 415 scans a short message that is received by using an input/output device; and if a certain short message carries textual content such as "WLAN", "WiFi", "password", and the like, the short message determiner 415 considers that the short message is the short message that carries the dynamic password. After obtaining the short message that carries the dynamic password from the short message determiner 415, the second reader 413 may obtain the dynamic account or the dynamic password from the short message in a manner of matching a keyword, for example by matching "account", "user name", or "password". The following short message is used as an example: "Dear user, your temporary WLAN access account is 31919236104, and the password is 807602, valid within 6 hours." In this case, the second reader 413 scans the short message, matches keywords "account" and "password", and reads a dynamic account as "31919236104" and a dynamic password as "807602". If the short message is "Dear user, your temporary WLAN access password is 807602, valid within 6 hours", and the second reader 413, by scanning and matching, reads the dynamic password as "807602" but fails to read the dynamic account, the second reader 413 obtains the local phone number "18912345678" that is stored in step 31, to use the local phone number "18912345678" as the access account. In this way, the mobile terminal can automatically obtain an access account and an access password, so that the user neither needs to read a short message from the network server, nor needs to perform an operation of entering a dynamic password or a dynamic account included in the short message.

Then, the second transmitter 416 obtains the access account and the access password from the second reader 413, and transmits them to the web authentication request initiating apparatus 42; the web authentication request initiating apparatus 42 encapsulates the access account and access password into a web authentication request that is based on a data protocol such as the HTTP, and automatically sends, by using the input/output apparatus 43, the web authentication request to the network server for authentication.

In this embodiment, the mobile terminal accesses a wireless local area network in a dynamic authentication manner, and includes the following structure: the account and password obtaining apparatus 41, the web authentication request initiating apparatus 42, the input/output apparatus 43, and the memory 44b, where the account and password obtaining apparatus 41 further includes: the second reader 413, the dynamic password requester 414, the short message determiner 415, and the second transmitter 416, where the memory 44b stores a local phone number, the second reader 413 reads the local phone number stored in the memory 44b, and the dynamic password requester 414 obtains the local phone number from the second reader 413, and sends, to a network server by using the input/output apparatus 43, a dynamic password request that carries the local phone number; and then the short message determiner 415 receives, by using the input/output apparatus 43, a short message that carries a dynamic password from the network server, the second reader 413 obtains an access account and an access password from the short message that carries the dynamic password, the second transmitter 416 obtains the access account and the access password from the short message that carries the dynamic password, and sends the access account and the access password to the web authentication request initiating apparatus 42, the web authentication request initiating apparatus 42 generates, according to the access account and the access password, a web authentication request that carries the access account and the access password, and sends the web authentication request to the network server by using the input/output apparatus 43, and the network server performs authentication. By applying this embodiment, a mobile terminal only needs to store a local phone number to automatically complete web authentication of a wireless local area network, so that a user does not need to read a short message from a network server, the account and the password do not need to be repeatedly entered, and a web authentication interface does not need to be displayed to the user, thereby avoiding a complex and repetitive authentication operation and improving user experience.

Embodiment 8

Figure 8:
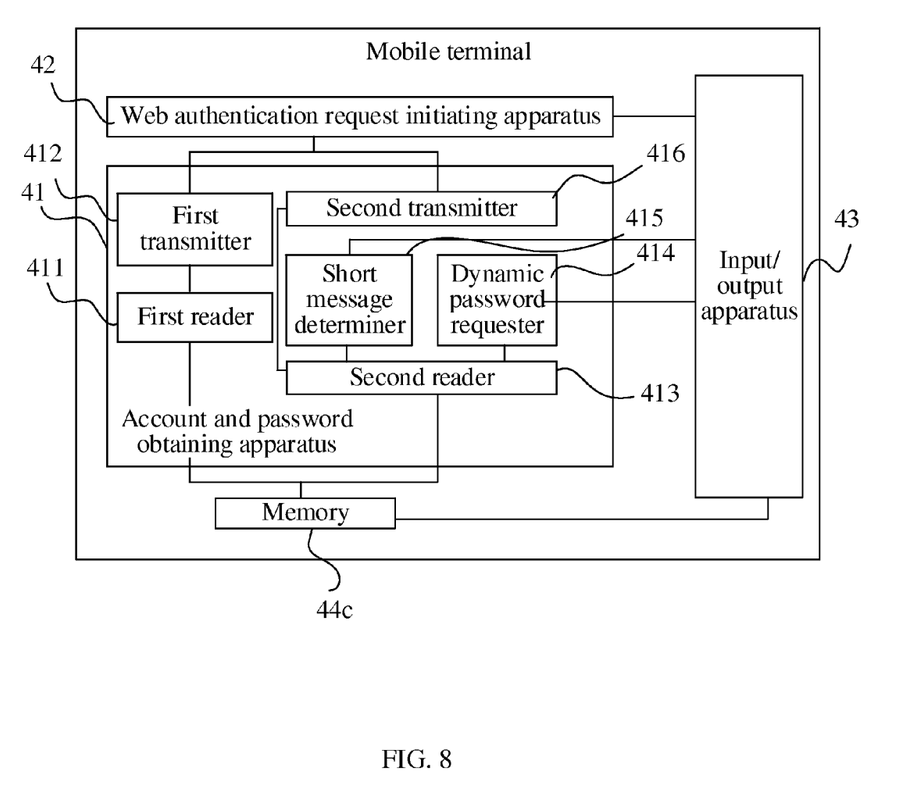
FIG. 8 is a schematic structural diagram of another mobile terminal according to Embodiment 8 of the present invention.

Referring to FIG. 8, an embodiment of the present invention provides a mobile terminal, which may access a wireless local area network in a static authentication manner or a dynamic authentication manner, and may include the following structure: an account and password obtaining apparatus 41, a web authentication request initiating apparatus 42, and an input/output apparatus 43, where the account and password obtaining apparatus 41 is configured to automatically obtain an access account and an access password, and transmit the access account and the access password to the web authentication request initiating apparatus 42; the web authentication request initiating apparatus 42 is configured to generate a web authentication request that carries the access account and the access password, and transmit the web authentication request to the input/output apparatus 43; and the input/output apparatus 43 is configured to send the web authentication request to a network server.

Optionally, the mobile terminal further includes: a memory 44c connected to the account and password obtaining apparatus 41 and the input/output apparatus 43 and configured to store the access account, the access password, or a local phone number, so that the account and password obtaining apparatus 41 can automatically obtain the access account and the access password.

Optionally, the memory 44c can store the access account, the access password, or the local phone number according to an input of a user by using an input/output device 43.

Further, the account and password obtaining apparatus 41 may include the following structure: a first reader 411, a first transmitter 412, a second reader 413, a dynamic password requester 414, a short message determiner 415, and a second transmitter 416.

Refer to Embodiment 6 and Embodiment 7 for a specific usage method of each structural component, which is not repeated herein.

In this embodiment, the mobile terminal accesses a wireless local area network in a static authentication manner or a dynamic authentication manner, and includes the following structure: the account and password obtaining apparatus 41, the web authentication request initiating apparatus 42, the input/output apparatus 43, and the memory 44c, where the account and password obtaining apparatus 41 further includes: the first reader 411, the first transmitter 412, the second reader 413, the dynamic password requester 414, the short message determiner 415, and the second transmitter 416. By applying this embodiment of the present invention, a mobile terminal only needs to store an access account, an access password, or a local phone number in advance to automatically complete web authentication of a wireless local area network, so that the account and the password do not need to be repeatedly entered, and a web authentication interface does not need to be displayed to the user either, thereby avoiding a complex and repetitive authentication operation and improving user experience.

It should be noted that, the account and password obtaining apparatus 41 and the web authentication request initiating apparatus 42 in Apparatus Embodiments 4, 5, 6, 7, and 8 of the present invention may each be implemented by using a separate hardware module, may be integrated into one microprocessor, or may be functional modules integrated into a main chip. The memory 44, the memory 44a, the memory 44b, and the memory 44c may be dedicated memories, may be a part of a storage space in a memory with large capacity, or may be external memories that are connected to a core network management entity, such as an SD card.

Persons skilled in the art may understand that, the apparatuses or devices of the terminal in the embodiment may be distributed in the mobile terminal of the embodiment according to description of the embodiment, or may be changed accordingly to be located in one or more devices different from those in the embodiment. The foregoing apparatuses or devices in the embodiment may be combined into one apparatus or device, or may be further divided into multiple sub-apparatuses or sub-devices.

In the foregoing embodiments, the description of each embodiment has different emphasis; and for part that is not detailed in an embodiment, refer to the relevant description of another embodiment.

Persons skilled in the art may understand that: the accompanying drawings are only diagrams of exemplary embodiments, and apparatuses, devices, or processes in the accompanying drawings are not necessarily required for implementing the present invention.

Through the foregoing description of the embodiments, persons skilled in the art can clearly understand that the present invention may be implemented by software plus a necessary universal hardware platform, and definitely may also be implemented by hardware. However, under most circumstances, the former is a preferred implementation manner. Based on such an understanding, the technical solutions of the present invention essentially, or the part contributing to the prior art may be implemented in the form of a software product. The computer software product is stored in a readable storage medium, for example, a floppy disk, a hard disk, or an optical disc of a computer, and includes several instructions for instructing a computer device (which may be a personal computer, a server, or a network device) to perform the methods described in the embodiments of the present invention.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however these modifications or replacements do not make the essence of corresponding technical solutions depart from the spirit and scope of the technical solutions in the embodiments of the present invention.

What is claimed is:

1. A wireless local area network authentication method, comprising:
   automatically obtaining, by a mobile terminal, an access account and an access password, wherein the mobile terminal stores a plurality of access accounts and a plurality of access passwords, wherein each of the plurality of access accounts and the plurality of access passwords corresponds to a service set identifier (SSID) of a wireless local area hotspot, and wherein the mobile terminal automatically obtains the access account and the access password through negotiation with a wireless local area network hotspot provider according to the SSID associated with the wireless local area network hotspot provider; and
   automatically sending, by the mobile terminal, a web authentication request to a network server, wherein the web authentication request carries the access account and the access password,
   wherein the mobile terminal selects between a static authentication manner and a dynamic authentication manner,
   wherein the access password comprises a static password when the static authentication manner is selected,
   wherein the access password comprises a dynamic password when the dynamic authentication manner is selected,
   wherein when the static authentication manner is selected, the method further comprises automatically obtaining, by the mobile terminal, the access account and the static password that are stored in the mobile terminal, and
   wherein when the dynamic authentication manner is selected, the method further comprises automatically obtaining, by the mobile terminal, a local phone number stored in the mobile terminal, sending, to the network server, a dynamic password request that carries the local phone number, and receiving a short message that carries the dynamic password from the network server.

2. The method according to claim 1, wherein the mobile terminal does not display a web authentication interface to a user.

3. The method according to claim 1, wherein when the dynamic authentication manner is selected, automatically obtaining, by the mobile terminal, the access account and the access password comprises:
   obtaining, by the mobile terminal, the local phone number stored in the mobile terminal, to use the local phone number as the access account; and
   obtaining, by the mobile terminal, the dynamic password carried in the short message, to use the dynamic password as the access password.

4. The method according to claim 3, wherein the mobile terminal determines the short message in a manner of matching a sending number or textual content, and wherein the mobile terminal obtains the dynamic account or the dynamic password from the short message in a manner of matching a keyword.

5. The method according to claim 1, wherein when the dynamic authentication manner is selected, the short message further carries a dynamic account, and automatically obtaining, by the mobile terminal, the access account and the access password comprises:
   obtaining, by the mobile terminal, the dynamic account carried in the short message, to use the dynamic account as the access account; and
   obtaining, by the mobile terminal, the dynamic password carried in the short message, to use the dynamic password as the access password.

6. The method according to claim 1, wherein the mobile terminal encapsulates the access account and the access password into the web authentication request in a format of a hypertext transfer protocol (HTTP) data packet, wherein the HTTP data packet is sent by the mobile terminal, and wherein the access account and the access password are obtained from matching keywords in a short message.

7. A mobile terminal, comprising:
   an account and password obtaining apparatus;
   a web authentication request initiating apparatus; and
   an input/output apparatus,
   wherein the account and password obtaining apparatus is configured to automatically obtain an access account and an access password, and transmit the access account and the access password to the web authentication request initiating apparatus,
   wherein the mobile terminal stores a plurality of access accounts and a plurality of access passwords,
   wherein each of the plurality of access accounts and the plurality of access passwords corresponds to a service set identifier (SSID) of a wireless local area hotspot,
   wherein the mobile terminal automatically obtains the access account and the access password through negotiation with a wireless local area network hotspot provider according to the SSID associated with the wireless local area network hotspot provider,
   wherein the web authentication request initiating apparatus is configured to generate a web authentication request that carries the access account and the access password, and transmit the web authentication request to the input/output apparatus,
   wherein the input/output apparatus is configured to send the web authentication request to a network server,
   wherein the mobile terminal selects between a static authentication manner and a dynamic authentication manner,
   wherein the access password comprises a static password when the static authentication manner is selected,
   wherein the access password comprises a dynamic password when the dynamic authentication manner is selected,
   wherein when the static authentication manner is selected, the mobile terminal automatically obtains the access account and the static password that are stored in the mobile terminal, and
   wherein when the dynamic authentication manner is selected, the mobile terminal automatically obtains a local phone number stored in the mobile terminal, sends, to the network server, a dynamic password request that carries the local phone number, and receives a short message that carries the dynamic password from the network server.

8. The mobile terminal according to claim 7, further comprising a memory connected to the account and password obtaining apparatus and the input/output apparatus separately and configured to store the access account, the access password, or a local phone number such that the account and password obtaining apparatus can automatically obtain the access account and the access password.

9. The mobile terminal according to claim 8, wherein the account and password obtaining apparatus comprises a first reader and a first transmitter, wherein the first reader is configured to obtain the access account and the access password that are stored in the memory, and transmit them to the first transmitter, and wherein the first transmitter is configured to transmit, to the web authentication request initiating apparatus, the access account and the access password that are received from the first reader.

10. The mobile terminal according to claim 8, wherein the account and password obtaining apparatus comprises:
   a second reader;
   a dynamic password requester;
   a short message determiner; and
   a second transmitter,
   wherein the second reader is configured to:
      obtain the local phone number stored in the memory, and obtain the dynamic password from a short message that carries the dynamic password and is determined by the short message determiner, to use the dynamic password as the access password and use the obtained local phone number as the access account; and
      obtain the dynamic password to use the dynamic password as the access password, and obtain a dynamic account to use the dynamic account as the access account when the short message carries the dynamic account,
   wherein the dynamic password requester is configured to obtain the local phone number from the second reader, and send, to the network server by using the input/output apparatus, a dynamic password request that carries the local phone number,
   wherein the short message determiner is configured to determine, by using the input/output apparatus, the short message that carries the dynamic password, and transmit the short message to the second reader, and
   wherein the second transmitter is configured to obtain the access account and the access password from the second reader, and transmit the access account and the access password to the web authentication request initiating apparatus.

11. The mobile terminal according to claim 7, wherein the mobile terminal encapsulates the access account and the access password into the web authentication request in a format of a hypertext transfer protocol (HTTP) data packet, wherein the HTTP data packet is sent by the mobile terminal, and wherein the access account and the access password are obtained from matching keywords in a short message.

12. A wireless local area network authentication method, comprising:
   automatically obtaining, by a mobile terminal, an access account and an access password, wherein the mobile terminal stores a plurality of access accounts and a plurality of access passwords, wherein each of the plurality of access accounts and the plurality of access passwords corresponds to a service set identifier (SSID) of a wireless local area hotspot, and wherein the mobile terminal automatically obtains the access account and the access password through negotiation with a wireless local area network hotspot provider according to the SSID associated with the wireless local area network hotspot provider; and
   automatically sending, by the mobile terminal, a web authentication request to a network server, wherein the web authentication request carries the access account and the access password, wherein the mobile terminal does not display a web authentication interface to a user,
   wherein the mobile terminal selects between a static authentication manner and a dynamic authentication manner,
   wherein the access password comprises a static password when the static authentication manner is selected,
   wherein the access password comprises a dynamic password when the dynamic authentication manner is selected,
   wherein when the static authentication manner is selected, the method further comprises automatically obtaining, by the mobile terminal, the access account and the static password that are stored in the mobile terminal, and
   wherein when the dynamic authentication manner is selected, the method further comprises automatically obtaining, by the mobile terminal, a local phone number stored in the mobile terminal, sending, to the network server, a dynamic password request that carries the local phone number, and receiving a short message that carries the dynamic password from the network server.

13. The method according to claim 12, wherein when the dynamic authentication manner is selected, automatically obtaining, by the mobile terminal, the access account and the access password comprises:
   obtaining, by the mobile terminal, the local phone number stored in the mobile terminal, to use the local phone number as the access account; and
   obtaining, by the mobile terminal, the dynamic password carried in the short message, to use the dynamic password as the access password.

14. The method according to claim 12, wherein when the dynamic authentication manner is selected, the short message further carries a dynamic account, and automatically obtaining, by the mobile terminal, the access account and the access password comprises:
   obtaining, by the mobile terminal, the dynamic account carried in the short message, to use the dynamic account as the access account; and
   obtaining, by the mobile terminal, the dynamic password carried in the short message, to use the dynamic password as the access password.

15. The method according to claim 14, wherein the mobile terminal determines the short message in a manner of matching a sending number or textual content, and wherein the mobile terminal obtains the dynamic account or the dynamic password from the short message in a manner of matching a keyword.

16. The method according to claim 12, wherein the mobile terminal encapsulates the access account and the access password into the web authentication request in a format of a hypertext transfer protocol (HTTP) data packet, wherein the HTTP data packet is sent by the mobile terminal, and wherein the access account and the access password are obtained from matching keywords in a short message.

* * * * *